United States Patent
Flesch et al.

(10) Patent No.: US 8,613,139 B2
(45) Date of Patent: Dec. 24, 2013

(54) MANUFACTURE OF A PORTION OF A METAL PART USING THE MIG METHOD WITH PULSED CURRENT AND WIRE

(75) Inventors: Thierry Jean Emile Flesch, Pringy (FR); Jean-Baptiste Mottin, Paris (FR)

(73) Assignee: SNECMA, Paris (FR)

( * ) Notice: Subject to any disclaimer, the term of this patent is extended or adjusted under 35 U.S.C. 154(b) by 392 days.

(21) Appl. No.: 12/994,790

(22) PCT Filed: May 29, 2009

(86) PCT No.: PCT/EP2009/056620
§ 371 (c)(1),
(2), (4) Date: Nov. 26, 2010

(87) PCT Pub. No.: WO2009/144301
PCT Pub. Date: Dec. 3, 2009

(65) Prior Publication Data
US 2011/0072660 A1    Mar. 31, 2011

(30) Foreign Application Priority Data
May 30, 2008   (FR) ..................... 08 02986

(51) Int. Cl.
*B21K 25/00*   (2006.01)
(52) U.S. Cl.
USPC ......... 29/889.2; 29/14; 219/76.12; 219/130.5
(58) Field of Classification Search
USPC .............. 29/889.2, 525.14; 219/76.12, 76.14, 219/130.32, 130.5, 130.51
See application file for complete search history.

(56) References Cited

U.S. PATENT DOCUMENTS

| | | | |
|---|---|---|---|
| 3,746,833 A * | 7/1973 | Ujiie | 219/137 R |
| 4,142,085 A * | 2/1979 | Knipstrom et al. | 219/61 |
| 4,441,012 A | 4/1984 | Risbeck et al. | |
| 4,575,611 A * | 3/1986 | Bertossa | 219/137 R |
| 5,038,014 A * | 8/1991 | Pratt et al. | 219/121.64 |
| 5,510,597 A * | 4/1996 | Kampmann et al. | 219/137 R |
| 5,558,791 A * | 9/1996 | Fawer | 219/137 WM |
| 5,580,636 A * | 12/1996 | Kampmann et al. | 428/119 |
| 6,118,098 A * | 9/2000 | Amos et al. | 219/137 R |
| 7,271,365 B2 * | 9/2007 | Stava et al. | 219/130.51 |
| 2003/0127431 A1 * | 7/2003 | Pratt et al. | 219/76.11 |
| 2007/0240897 A1 * | 10/2007 | Gafri et al. | 174/94 R |

FOREIGN PATENT DOCUMENTS

FR   2 518 000   6/1983

OTHER PUBLICATIONS

T. Lant, D.L. Robinsonm B. Spafford, J. Storesund, Review of weld repair procedures of low alloy steels designed to minimise the risk of future cracking, 2001, International Journal of Pressure Vessels and Piping, Elsevier, 78, 813-818.*
International Search Report issued Sep. 15, 2009 in PCT/EP09/056620 filed May 29, 2009.

* cited by examiner

*Primary Examiner* — David Bryant
*Assistant Examiner* — Ruth G Hidalgo-Hernandez
(74) *Attorney, Agent, or Firm* — Oblon, Spivak, McClelland, Maier & Neustadt, L.L.P.

(57) ABSTRACT

A method for manufacturing at least a portion of a metal part of a turbine engine having a width. The portion of the metal part is manufactured by metal disposition using a MIG welding apparatus including a pulsed current generator and a pulsed deposition-wire flow, and used for varying the current and flow, the manufacture being carried out in the form of metal beads in several consecutive layers.

6 Claims, 2 Drawing Sheets

MANUFACTURE OF A PORTION OF A METAL PART USING THE MIG METHOD WITH PULSED CURRENT AND WIRE

BACKGROUND OF THE INVENTION

1. Field of the Invention

The invention relates to the manufacture and refilling of metal parts of a turbine engine. More particularly, the invention relates to the reaction of a discontinuous volume, in particular a flange or a boss.

2. Description of the Related Art

The creation of a discontinuous volume is currently achieved by conventional methods such as forging, casting or the welding of two parts. The major drawback of these methods is the associated production cost, in particular for small batches or for parts with a complex geometry.

Welding of the TIG type (Tungsten Inert Gas) is a method of arc welding with a nonconsumable electrode in a gas atmosphere. This technique is used with a filler metal for manufacturing or refilling parts such as the blades of a turbine engine. The neutral gas, generally based on argon or helium, isolates the molten metal, the hot zones and the tungsten electrode from the air, thus avoiding any oxidation. In a neutral gas flow, an electric arc is established between the nonconsumable tungsten electrode and the part to be welded. The heat released by the arc melts the edges of the part and the filler metal, if there is one, thus contributing to the formation of the bead.

BRIEF SUMMARY OF THE INVENTION

It is an object of the invention to provide a technique for the manufacture or refurbishment of parts, or portions of parts, allowing large application of material by the formation of beads with a large cross section. While the manual TIG method known from the prior art makes it possible to deposit beads whose cross section is at most 10 mm$^2$, the object is to produce deposits in which the cross section of the bead is greater, in particular with a cross section of more than 25 mm$^2$.

What is important is not to create, or at least to minimize, the possible residual distortions of the part.

It is also an object to ensure good integrity of the material in the deposited zone. The invention achieves these objects by employing a MIG method with pulsed current and wire.

A MIG method with pulsed current and wire, such as that known in welding by the abbreviation CMT (Cold Metal Transfer) and described in the patent applications WO2006125234, WO2006089322 or WO2005042199, adopts the principle of the MIG method with pulsed current and supplements it in particular with fine management of the deployment of the wire. The wire is deployed continuously until the appearance of a short circuit, which occurs when the wire end is in contact with the part. At this moment, the wire is retracted, allowing the drop of metal to be deposited. The process is then resumed. This cycle is repeated at a frequency which may be as much as 70 Hz. The supply of energy is therefore limited while, by virtue of computer control, ensuring a high metallurgical quality. Furthermore, the welding is carried out substantially without spraying. MIG welding with pulsed current and wire offers advantages over MIG welding with a continuous current, for the following reasons: lower supply of heat, possible use of wire with larger diameters, substantially no spraying and regular penetration.

According to the invention, a method is employed for manufacturing at least a portion of determined width of a metal part of a turbine engine, characterized in that said portion is manufactured by metal application using a MIG welding apparatus comprising a pulsed current generator and a pulsed filler-wire feed rate, with which the current and the feed rate are varied, the manufacture being carried out in the form of metal beads in a plurality of successive layers.

While the MIG technique with pulsed current and wire is known for the welding of parts to one another, it has been observed according to the invention that when suitably controlled, it thus opens up the possibility of manufacturing portions of parts by virtue of a high deposition rate in the form of beads with a large cross section. It generates little deformation while maintaining a metallurgical quality comparable to that obtained by the TIG technique.

According to a first embodiment, on a first layer A, a first bead is produced along a first main axis and with a determined first width, a second bead is subsequently produced along a second main axis and with a second determined width, while ensuring an overlap on the first bead, said overlap varying from ¼ to ½ of the width of the first bead, and the number of beads necessary for the surface covered by the beads to be greater than the width L of said portion are produced; on a second layer B, a first bead is produced while centering its axis on the intersection of the first two beads of the first layer A, a second bead is produced while ensuring an overlap on the first bead of said second layer, said overlap varying from ¼ to ½ of the width of the first bead, and the number of beads necessary for the surface covered by the beads to be greater than the width L of said portion are produced; a number of layers are manufactured so as to obtain the desired height H of said portion of the part.

According to a variant of the manufacturing method, on a first layer A, a first bead is produced along a first main axis and with a determined first width, a second bead is subsequently produced along a second main axis and with a second determined width, while ensuring an overlap on the first bead, said overlap varying from 0 to ¼ of the width of the first bead, and the number of beads necessary for the surface covered by the beads to be greater than the width of said portion are produced, on the second layer, a first bead is produced while centering its axis on the axis of the first bead of the first layer; a third layer is furthermore produced with a first bead produced while centering its axis on the intersection of the first two beads of the second layer B; the necessary number of beads are produced while complying with the positioning rule of the axis of the bead, and the operations are repeated so as to obtain the desired height of said portion of the part.

The manufacturing method of the invention is particularly suitable for parts whose thickness is greater than or equal to 3 mm.

One advantage of using the MIG method with pulsed current and wire is that for equal penetration and speed, the average welding energy is less than with a TIG method, whence its applications for the welding of thin products. Furthermore, the lower supply of energy reduces the heat transmitted to the plate, which limits the deformations.

According to the invention, the materials of the parts in question are stainless steels, alloys based on nickel, cobalt or titanium alloys.

BRIEF DESCRIPTION OF THE DRAWINGS

The objects, aspects and advantages of the present invention will be understood more clearly with the description given below of various embodiments. These are presented by way of nonlimiting examples. The appended drawings are described below.

DETAILED DESCRIPTION OF THE INVENTION

Figure 1:
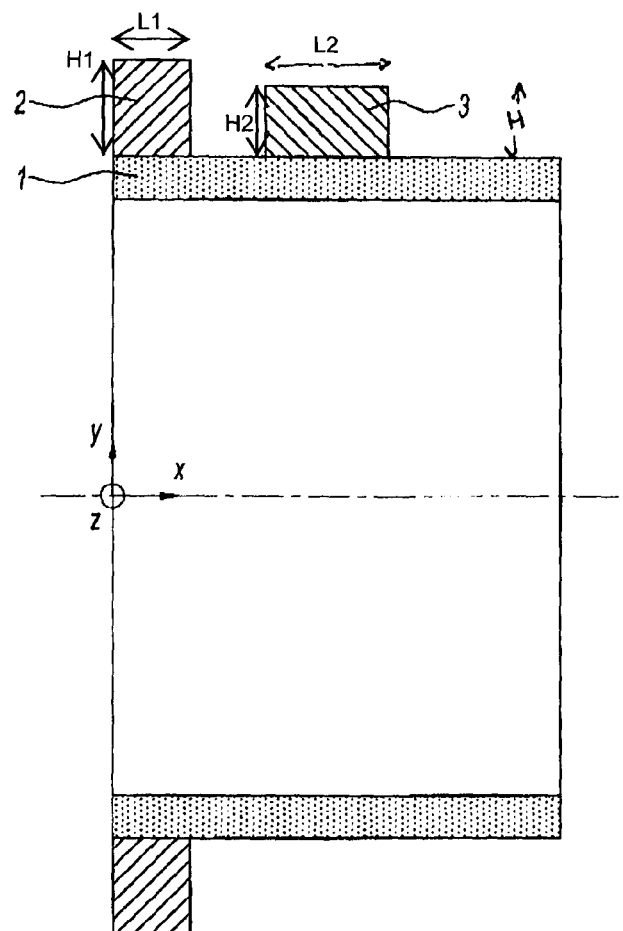
FIG. 1 schematically represents the manufacture/refilling of a flange or a boss.

FIG. 1 represents a base part 1 of cylindrical shape and with a thickness at least equal to 3 mm, on which a flange 2 or alternatively a boss 3 is intended to be produced. The flange 2 is in the form of an annular portion, here on the end of the cylindrical part; it is produced over the entire circumference of the base part 1 with a determined height H1 and width L1.

The materials relevant to the method of the invention are stainless steels such as the one with the formula X5CrNiCu17.4 or W11CrNiMoV12, alloys based on nickel such as the one with the formula NiCr19Fe19Nb5Mo3 or based on cobalt such as the one with the formula CoCrNi22W, and titanium alloys such as the one with the formula TiAl6V.

The boss 3 is produced on a portion of the surface of the metal part. Its height H2 and its width L2 are also determined.

Figure 3:
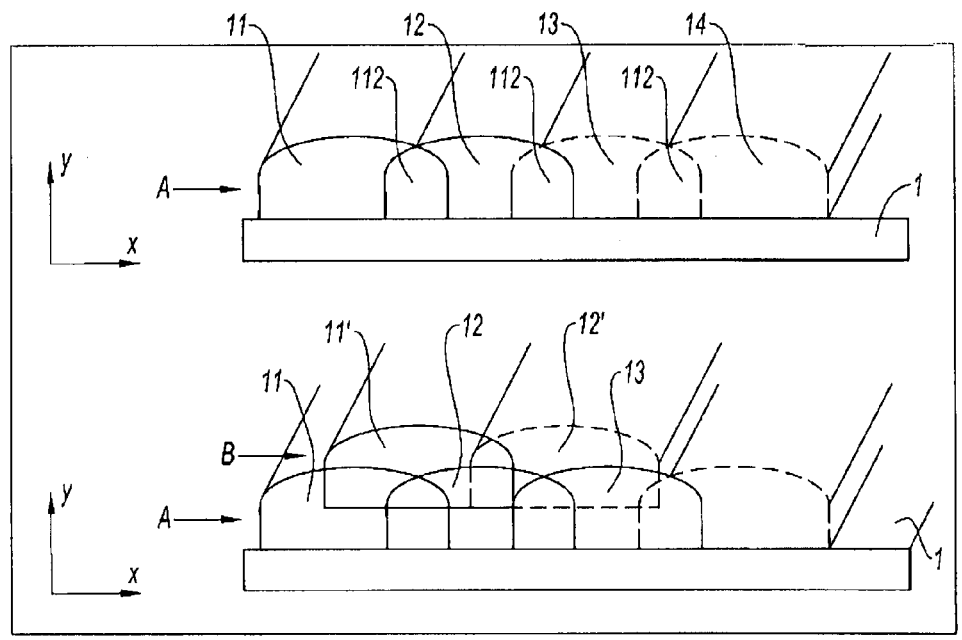
FIG. 3 shows a strategy of manufacturing by layers.
Figure 4:
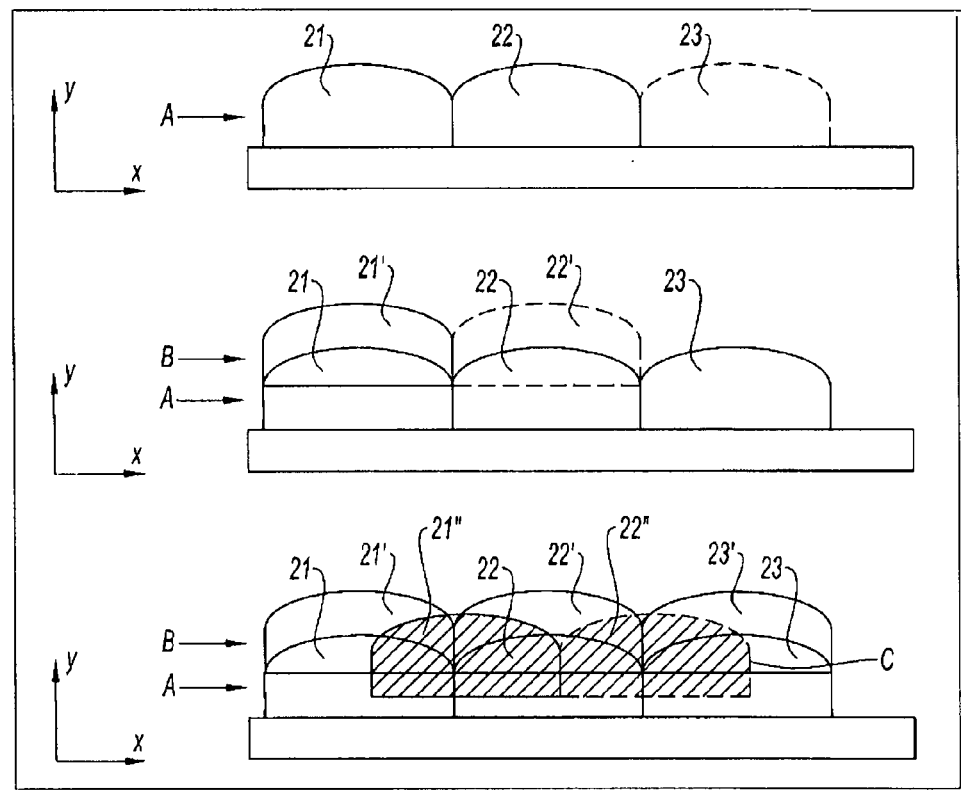
FIG. 4 shows a strategy of manufacture by superposition of beads.

In order to manufacture the flange or the boss, one of the strategies developed in the manufacturing method of FIG. 3 or FIG. 4 may be used.

Figure 2:
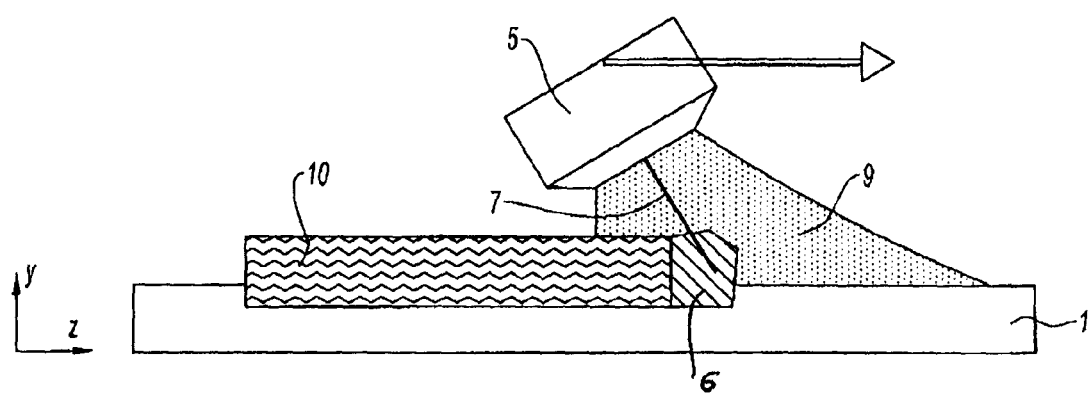
FIG. 2 represents the manufacture of the first bead of a boss.

FIG. 2 presents the deposition of a weld bead 10 on the part 1 in order to form the boss or the flange. To this end, according to the invention, a MIG welding machine with pulsed wire and current is used, comprising a current generator controlled for example by a microprocessor (not represented in the figure).

By way of example, parameters applicable to the pulsed MIG machine provided, by the company Fronius and making it possible to carry out the invention, are for Inconel the curve reference CrNi 19-9 and for titanium CuSi 3 Ø1. The company Fronius provides its clients with pre-established parameter sets making it possible to adapt the invention to each material.

The distal end of the welding head can be seen with the wire constituting the filler metal 7, surrounded by a nozzle 5. The filler metal 7 and the molten bath 6 are surrounded by a shielding gas flow 9 composed of helium and/or argon. The nozzle 5 is driven in the manufacturing direction of the bead 10. The length and the width of the beads are defined as a function of the wire feed rate. The wire plays a crucial role in the formation of the electric arc; specifically, the greater the diameter of the wire is, the more the deposition rate and the penetration depth will decrease, the more the width of the bead will increase and the higher the energy necessary for the melting will be. The assembly is connected to a programmable automated machine, the latter controlling all the parameters which have an effect on the welding, thus making it possible to have a stable process while maintaining compatibility between the parameters such as the diameter of the wire, the type of wire or the type of shielding gas.

According to the prior art, the techniques for manufacturing parts employ methods such as TIG, or laser refilling (powder entrained in the laser beam), the deposition speed of which is low. The cross section of the bead remains less than 10 mm$^2$, leading to significant deformations of the part. The method of manufacture by MIG with pulsed current and wire thus makes it possible to multiply the bead cross sections by at least 2, 5 and to reduce the deformations experienced by the part. The techniques of producing beads make it possible to minimize the deformations further.

FIG. 3 shows a strategy of manufacture by layers. The first phase of this strategy starts with cleaning and degreasing the part 1. In order to produce the first layer A, the material is deposited in successive mutually parallel beads. The shielding gas is for example applied onto the face of the part being manufactured, optionally with application on the opposite face.

The beads are deposited in the following way. A first bead 11 is deposited along a first main axis and with a determined first width, followed by a second 12 along a second main axis and with a determined second width, while ensuring an overlap 112 on the first bead 11. This overlap may vary from ¼ to ½ of the width of the first bead. As many beads 13, 14 etc. as necessary are produced while complying with the overlap rule. The surface covered by all the widths together is greater, in both width L and length, than the desired surface of the portion of the part. In order to produce the beads, the nozzle is always displaced in the same direction. The nozzle may also be carried out in alternate directions.

A second layer B is subsequently arranged on the first. The first bead 11' of this second layer is formed parallel to the beads of the first layer, while being centered on the overlap zone 112 of the first two beads 11, 12 of the previous layer A. Next, the second bead 12' is produced like the previous ones while ensuring an overlap on the first, this overlap varying from ¼ to ½ of the width of the bead. As many beads as necessary are produced while complying with the overlap rule. As for the first layer A, the surface covered by the beads is greater than the desired surface of the portion of the part.

In order to obtain the desired height, for the boss or the flange, the phases described above are repeated as many times as necessary. Preferably, in order to produce the beads of the second layer, the nozzle is displaced in the opposite direction to that for producing the first layer.

FIG. 4 shows an alternative strategy for manufacture by the superposition of beads.

As before, the first phase starts with cleaning and degreasing the part.

In order to produce the first layer A, a first bead 21 is deposited along a first main axis and with a determined first width, followed by a second bead 22 along a second main axis and with a determined second width, while ensuring an overlap on the first bead which is less than in the previous case; the overlap varies from 0 to ¼ of the width of the bead. The desired number of beads 21, 22, 23 etc. are produced while complying with the overlap rule, so that the surface covered by the beads is greater than the final surface of the portion of the part. In order to produce the beads in this phase, the nozzle is displaced in the same direction.

For the second layer B, the first bead 21' is deposited parallel to the other beads. Its axis is centered on the axis of the first bead 11 produced on the previous layer A. Subsequently, the second bead 22' of the second layer is deposited while ensuring the small overlap described in the previous phase. The desired number of beads are produced, while complying with the overlap rule. The surface covered by the beads is greater than the desired surface of the portion. In order to produce the beads of this second phase, the nozzle has a displacement direction opposite to that which it had during the production of the previous layer.

The third phase of this strategy consists in producing a homogenization layer C. To this end, a first bead 21" is produced parallel to the previous beads while centering its axis on the intersection of the beads 21' and 22' of the previous layer B. As can be seen in the figure, this bead 22" is produced so as to homogenize the material between the adjacent beads of the two underlying layers A and B.

The second bead 22" is produced while centering its axis on the intersection of the beads 22' and 23' of the underlying layer B. As many beads as necessary are produced, so that the surface covered is greater than that desired for the portion of the part, while complying with the rule for positioning the axis of the beads. The nozzle is preferably displaced in the opposite direction to that of the previous layer. In order to obtain the desired height, for the boss or the flange, the phases described above should be repeated as many times as necessary.

The invention claimed is:

1. A method for manufacturing at least a portion of width L and height H of a metal part of a turbine engine, comprising:
    manufacturing said portion by metal application using a MIG welding apparatus comprising a pulsed current generator and a pulsed filler-wire feed rate, with which the current and the feed rate are varied, the manufacture being carried out using metal beads in a plurality of successive layers,
    wherein on a first layer, a first bead is produced along a first main axis and with a determined first width, a second bead is subsequently produced along a second main axis and with a second determined width, while ensuring an overlap on the first bead, said overlap varying from ¼ to ½ of the width of the first bead, and the number of beads necessary for the surface covered by the beads to be greater than the width of said portion are produced,
    wherein on a second layer, a first bead is produced while centering its axis on the intersection of the first two beads of the first layer, a second bead is produced while ensuring an overlap on the first bead, said overlap varying from ¼ to ½ of the width of the first bead, and the number of beads necessary for the surface covered by the beads to be greater than the width of said portion are produced, and
    wherein a number of layers are manufactured so as to obtain the desired height H of said portion of the part.

2. The method as claimed in claim 1, wherein the MIG welding apparatus further comprises a shielding gas which is a mixture consisting of helium and argon.

3. The method as claimed in claim 1,
    wherein the MIG welding apparatus further comprises a nozzle, and
    wherein the nozzle is displaced in a first direction when producing the first layer and the nozzle is displaced in a second direction, opposite to the first, when producing the second layer.

4. A method for manufacturing at least a portion of width L and height H of a metal part of a turbine engine, comprising:
    manufacturing said portion by metal application using a MIG welding apparatus comprising a pulsed current generator and a pulsed filler-wire feed rate, with which the current and the feed rate are varied, the manufacture being carried out using metal beads in a plurality of successive layers,
    wherein, on a first layer, a first bead is produced along a first main axis and with a determined first width, a second bead is subsequently produced along a second main axis and with a second determined width, while ensuring an overlap on the first bead, said overlap varying from 0 to ¼ of the width of the first bead, and the number of beads necessary for the surface covered by the beads to be greater than the width of said portion are produced,
    wherein on a second layer, a first bead is produced while centering its axis on the axis of the first bead of the first layer, and a second bead is produced while centering its axis on the axis of the second bead of the first layer,
    wherein a third layer is furthermore produced with a first bead produced while centering its axis on the intersection of the first two beads of the second layer, and the necessary number of beads are produced while complying with a positioning rule of the axis of the beads, and
    wherein the operations are repeated so as to obtain the desired height of said portion of the part.

5. The method as claimed in claims 1 or 4, wherein the thickness of the part is greater than or equal to 3 mm.

6. The method as claimed in one of claims 1 or 4, the parts in wherein the part comprises stainless steels, nickel bases, cobalt bases or titanium alloys.

\* \* \* \* \*

UNITED STATES PATENT AND TRADEMARK OFFICE
CERTIFICATE OF CORRECTION

PATENT NO.        : 8,613,139 B2
APPLICATION NO.   : 12/994790
DATED             : December 24, 2013
INVENTOR(S)       : Thierry Jean Emile Flesch et al.

It is certified that error appears in the above-identified patent and that said Letters Patent is hereby corrected as shown below:

In the Claims

Column 6, Lines 37-39, Claim 6:
Change "The method as claimed in one of claims 1 or 4, the parts in where in the part comprises stainless steels, nickel bases, cobalt bases or titanium alloys." to --The method as claimed in one of claims 1 or 4, wherein the part comprises stainless steels, nickel bases, cobalt bases or titanium alloys--.

Signed and Sealed this
Twenty-seventh Day of May, 2014

Michelle K. Lee
*Deputy Director of the United States Patent and Trademark Office*